(12) United States Patent
Han

(10) Patent No.: US 12,233,943 B2
(45) Date of Patent: Feb. 25, 2025

(54) FRONT PILLAR STRUCTURE

(71) Applicants: Hyundai Motor Company, Seoul (KR); Kia Corporation, Seoul (KR)

(72) Inventor: Yoonkyoung Han, Suwon-si (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 319 days.

(21) Appl. No.: 17/991,194

(22) Filed: Nov. 21, 2022

(65) Prior Publication Data
US 2023/0382462 A1 Nov. 30, 2023

(30) Foreign Application Priority Data

May 31, 2022 (KR) .......................... 10-2022-0067210

(51) Int. Cl.
| | |
|---|---|
| *B62D 25/04* | (2006.01) |
| *B60S 1/02* | (2006.01) |
| *B60S 1/48* | (2006.01) |
| *B60S 1/62* | (2006.01) |
| *B62D 27/02* | (2006.01) |

(52) U.S. Cl.
CPC ................ *B62D 25/04* (2013.01); *B60S 1/02* (2013.01); *B60S 1/48* (2013.01); *B60S 1/62* (2013.01); *B62D 27/023* (2013.01)

(58) Field of Classification Search
CPC ...... B62D 25/04; B62D 21/15; B62D 21/157; B62D 27/023; B60S 1/02; B60S 1/48; B60S 1/62
USPC .............. 296/193.06, 208, 187.09, 1, 29, 30
See application file for complete search history.

(56) References Cited

U.S. PATENT DOCUMENTS

| | | | | |
|---|---|---|---|---|
| 9,574,325 | B2 * | 2/2017 | Ikeda ...................... | B62D 55/06 |
| 11,167,802 | B2 * | 11/2021 | Marukawa ............. | B62D 25/04 |

* cited by examiner

*Primary Examiner* — Dennis H Pedder
(74) *Attorney, Agent, or Firm* — Slater Matsil, LLP

(57) ABSTRACT

An embodiment front pillar structure includes a side outer reinforcement assembly, a first reinforcement member coupled to a front portion of the side outer reinforcement assembly to define a first guide passage through which a flexible part having a predetermined length and mounted to the front pillar structure is introduced, a second reinforcement member coupled to a rear portion of the side outer reinforcement assembly to define a second guide passage through which the flexible part is drawn, and a side inner panel assembly coupled to the side outer reinforcement assembly, the side inner panel assembly including an introduction hole connected to the first guide passage and a draw hole connected to the second guide passage.

20 Claims, 17 Drawing Sheets

FRONT PILLAR STRUCTURE

CROSS-REFERENCE TO RELATED APPLICATIONS

This application claims the benefit of Korean Patent Application No. 10-2022-0067210, filed on May 31, 2022, which application is hereby incorporated herein by reference.

TECHNICAL FIELD

An embodiment of the present invention relates to a vehicle body of a vehicle.

BACKGROUND

Recently, the vehicle industry has been introducing a new concept of future mobility vision for realizing a human-centered and dynamic future city. One of these future mobility solutions is a purpose built vehicle (PBV) as a purpose-based mobility.

An example of the PBV may be an electric vehicle (EV)-based environmentally friendly mobile vehicle. Further, the PBV may provide various customized services to a user during a time it takes to travel on the ground to a destination using artificial intelligence and an autonomous driving method.

On the other hand, in the PBV of an autonomous driving type, a flexible part having a predetermined length such as a hose, a tube, and a wire are mounted inside a body of the vehicle.

One example of such a flexible part is a sensor cleaning hose configured to clean a sensor (e.g., a LIDAR sensor) installed at a roof of the vehicle. The sensor cleaning hose connects a washer liquid reservoir tank provided in the vehicle to a washer liquid injection nozzle fixed to the roof.

In a conventional art, the sensor cleaning hose is mounted inside a headliner consisting of a pillar trim covering a roof panel and a roof side rail member.

However, according to the conventional art, as the sensor cleaning hose is mounted together with a part such as the wire and a curtain airbag disposed inside the headliner, there is a need to increase a cross-section of the pillar trim to form a mounting space of the sensor cleaning hose. That is, in order to add the sensor cleaning hose, a space must be prepared by increasing the cross-section of the pillar trim or reducing the cross-section of the body pillar. However, an increase in the cross-section of the pillar trim deteriorates visibility, and a reduction in the cross-section of the body pillar deteriorates the body stiffness and crash performance.

The above information disclosed in this background section is only for enhancement of understanding of the background of the invention, and therefore it may contain information that does not form the prior art that is already known to a person of ordinary skill in the art.

SUMMARY

An embodiment of the present invention relates to a vehicle body of a vehicle. Particular embodiments relate to a front pillar structure at which a flexible part having a set length is mounted.

Embodiments of the present invention provide a front pillar structure that allows a flexible part such as a sensor cleaning hose to be mounted inside a cross-section of a pillar without increasing the cross-section of the pillar.

An embodiment of the present invention provides the front pillar structure that includes a front roof rail and a rear roof rail coupled to a front portion and a rear portion of both side structures along a vehicle width direction of a vehicle body, the front pillar structure further including a side outer reinforcement assembly, a first reinforcement member that is coupled to a front portion of the side outer reinforcement assembly to form a first guide passage through which the flexible part is introduced, a second reinforcement member that is coupled to a rear portion of the side outer reinforcement assembly to form a second guide passage through which the flexible part is drawn, and a side inner panel assembly that includes an introduction hole connected to the first guide passage and a draw hole connected to the second guide passage and that is coupled to the side outer reinforcement assembly.

The side outer reinforcement assembly may include a front pillar outer reinforcement member that is coupled to the first reinforcement member and the side inner panel assembly and a side outer reinforcement member that is coupled to an inner surface of the front pillar outer reinforcement member and is coupled to the second reinforcement member.

The first reinforcement member may be coupled to the front pillar outer reinforcement member with the side outer reinforcement member interposed therebetween.

The first guide passage may be formed between the first reinforcement member and the side outer reinforcement member.

The second reinforcement member may be coupled to an inner surface of the side outer reinforcement member.

The second guide passage may be formed between the second reinforcement member and the side inner panel assembly.

The side inner panel assembly may include a front pillar inner panel that is coupled to the first reinforcement member and the front pillar outer reinforcement member and a side inner panel that is coupled to the front pillar inner panel and the front pillar outer reinforcement member.

A third guide passage formed between the front pillar inner panel and the side outer reinforcement member may be connected to the first guide passage and the second guide passage.

The introduction hole may be formed at the front pillar inner panel.

The draw hole may be formed at the side inner panel.

The first reinforcement member may include a first upper bonding portion that is bonded to an upper portion of the front pillar outer reinforcement member, a first lower bonding portion that is bonded to a lower portion of the front pillar outer reinforcement member, and a first part guide portion that is formed between the first upper bonding portion and the first lower bonding portion to form the first guide passage.

The first reinforcement member may further include an introduction guide portion that is connected to the first guide passage and the introduction hole.

The second reinforcement member may include a second upper bonding portion that is bonded to an upper portion of the side outer reinforcement member, a second lower bonding portion that is bonded to a lower portion of the side outer reinforcement member, and a second part guide portion that is formed between the second upper bonding portion and the second lower bonding portion to form the second guide passage.

The second reinforcement member may further include a draw guide portion that is connected to the second guide passage and the draw hole.

The draw guide portion may include an inclined surface inclined toward the draw hole.

The front pillar structure may further include a form pad layer applied to the second reinforcement member.

The flexible part may include a sensor cleaning hose that flows a washer liquid to clean a sensor installed at a roof of a vehicle with the washer liquid.

The embodiments of the present invention may easily mount the flexible part such as the sensor cleaning hose inside the cross-section of the pillar without increasing the cross-section of the pillar, and may facilitate after-sales service, repair, and replacement of the flexible part.

In addition, effects that may be obtained or expected from embodiments of the present invention are directly or suggestively described in the following detailed description. That is, various effects expected from embodiments of the present invention will be described in the following detailed description.

BRIEF DESCRIPTION OF THE DRAWINGS

These drawings are for reference only in describing embodiments of the present invention, and therefore, the technical idea of the present invention should not be limited to the accompanying drawings.

Figure 1:
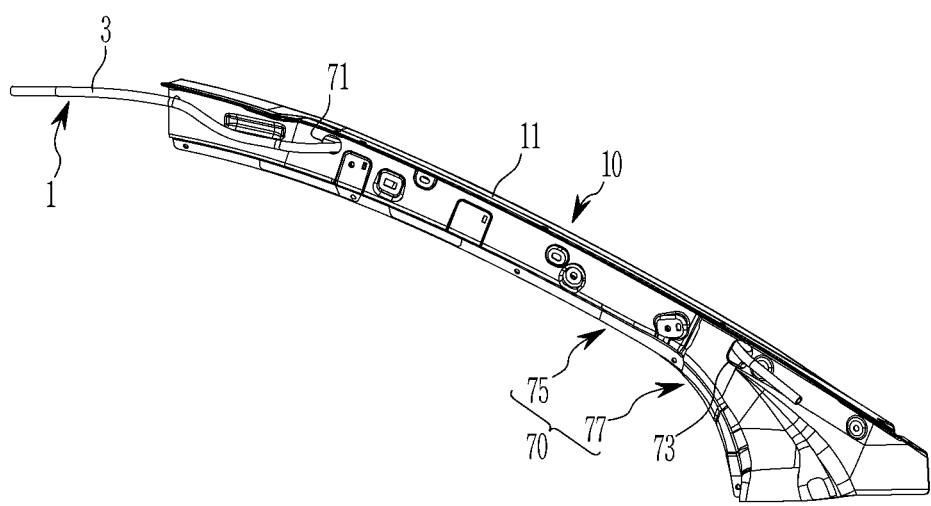
FIG. 1 is a combined perspective view showing a front pillar structure according to an embodiment of the present invention.

It should be understood that the above-referenced drawings are not necessarily to scale, presenting a somewhat simplified representation of various preferred features illustrative of the basic principles of embodiments of the invention. The specific design features of embodiments of the present invention, including, for example, specific dimensions, orientations, locations, and shapes, will be determined in part by the particular intended application and use environment.

The following reference identifiers may be used in connection with the accompanying drawings to describe exemplary embodiments of the present disclosure.

| | |
|---|---|
| 1: flexible part | 3: sensor cleaning hose |
| 4: washer liquid injection nozzle | 5: washer liquid |
| 6: roof structure | 7: sensor device |
| 10: side outer reinforcement assembly | 11: front pillar outer reinforcement member |
| 15: first bonding portion | 17: second bonding portion |
| 21: side outer reinforcement member | 30: first reinforcement member |
| 31: first guide passage | 33: first upper bonding portion |
| 35: first lower bonding portion | 37: first part guide portion |
| 39: introduction guide portion | 50: second reinforcement member |
| 51: second guide passage | 53: second upper bonding portion |
| 55: second lower bonding portion | 57: second part guide portion |
| 59: draw guide portion | 61: inclined surface |
| 70: side inner panel assembly | 71: introduction hole |
| 73: draw hole | 75: front pillar inner panel |
| 77: side inner panel | 81: third bonding portion |
| 83: fourth bonding portion | 85: third guide passage |
| 90: foam pad layer | 100: front pillar structure |

DETAILED DESCRIPTION OF ILLUSTRATIVE EMBODIMENTS

Embodiments of the present invention will be described more fully hereinafter with reference to the accompanying drawings, in which exemplary embodiments of the invention are shown. As those skilled in the art would realize, the described embodiments may be modified in various different ways, all without departing from the spirit or scope of the present invention.

The terminology used herein is for the purpose of describing particular embodiments only and is not intended to be limiting of the present invention. As used herein, the singular forms "a," "an," and "the" are intended to include the plural forms as well, unless the context clearly indicates otherwise.

It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. The term "coupled" denotes a physical relationship between two components whereby the components are either directly connected to one another by welding, self piercing rivets (SPRs), flow drill screws (FDSs), a structural adhesive, and the like, or indirectly connected via one or more intermediary components.

It is understood that the term "vehicle," "vehicular," "car," or other similar term as used herein is inclusive of motor vehicles, in general, such as passenger automobiles including sport utility vehicles (SUVs), buses, trucks, various commercial vehicles, watercraft including a variety of boats and ships, aircraft, and the like, and includes hybrid vehicles, electric vehicles, hybrid electric vehicles, electric vehicle-based purpose built vehicles (PBVs), hydrogen-powered vehicles, and other alternative fuel vehicles (for example, fuels derived from resources other than petroleum).

Hereinafter, embodiments of the present invention will be described in detail with reference to the accompanying drawings.

FIG. 1 is a combined perspective view showing a front pillar structure according to an embodiment of the present invention.

Referring to FIG. 1, the front pillar structure (or a front pillar assembly) 100 according to an embodiment of the present invention may be applied to a vehicle body of an autonomous vehicle known to a person of ordinary skill in the art. Further, the front pillar structure wo according to an embodiment of the present invention may be applied to a vehicle body of a purpose built vehicle (hereinafter referred to as a 'PBV').

In one example, the PBV may be utilized as an electric vehicle-based life module vehicle that provides various services to an occupant during a time it takes to travel on the ground to a destination in an autonomous driving method. The life module vehicle is generally referred to as a robo-taxi, a robo-shuttle, or a hailing vehicle by those skilled in the art.

A flexible part 1 having a predetermined length is mounted on the vehicle body of the autonomous vehicle such as the PBV. In one example, the flexible part 1 may include a sensor cleaning hose 3.

Figure 2:
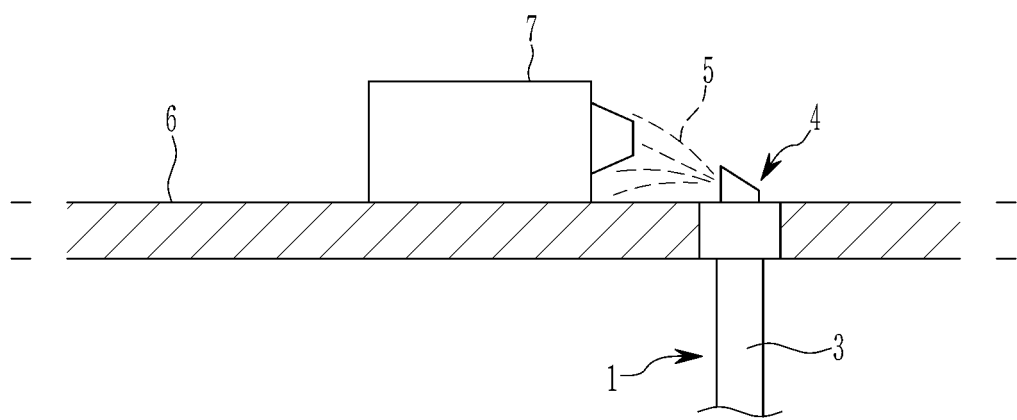
FIG. 2 is a view schematically showing an application example of a sensor cleaning hose applied to the front pillar structure according to an embodiment of the present invention.

As shown in FIG. 2, the sensor cleaning hose 3 sprays a washer liquid 5 to at least one sensor device 7 mounted on a roof structure 6 of the vehicle body, and the at least one sensor device 7 is cleaned with the washer liquid 5. In one example, the at least one sensor device 7 may include a LIDAR sensor.

Here, the sensor cleaning hose 3 may be connected to a washer liquid injection nozzle 4 fixed to the roof structure 6 and a washer liquid reservoir tank (not shown) provided in the vehicle. The sensor cleaning hose 3 may flow the washer liquid 5 supplied from the washer liquid reservoir tank to the washer liquid injection nozzle 4.

As described above, for example, the flexible part 1 is the sensor cleaning hose 3, but it is not limited thereto, and as an alternative, the flexible part 1 may include a flexible part such as a tube and a wire known to a person of ordinary skill in the art.

In embodiments of the present specification, reference directions for describing the following constituent elements may be set in a vehicle body front-rear direction (for example, a vehicle body length direction or longitudinal direction), a vehicle width direction (for example, a lateral direction), and a vertical direction (for example, a height direction) based on the vehicle body.

In addition, in embodiments of the present specification, an 'upper end portion', 'upper portion', 'upper end', or 'upper surface' of a constituent element represents an end portion, a portion, an end, or a surface of the constituent element that is relatively higher in the drawing, and a 'lower end portion', a 'lower portion', a 'lower end', or a 'lower surface' of a constituent element represents an end portion, a portion, an end, or a surface of the constituent element that is relatively lower in the drawing.

In addition, in embodiments of the present specification, an end of a constituent element (for example, one end, the other end, both ends, or the like) represents an end of the constituent element in any one direction, and an end portion of a constituent element (for example, one end portion, the other end portion, both end portions, a front end portion, a rear end portion, or the like) represents a portion of the constituent element including the end.

The front pillar structure 100 according to an embodiment of the present invention is configured to mount the sensor cleaning hose 3 inside a cross-section of a pillar without increasing the cross-section of the pillar.

In addition, the front pillar structure 100 according to an embodiment of the present invention has a structure in which after-sales service, repair, and replacement of the flexible part are facilitated.

Figure 3:
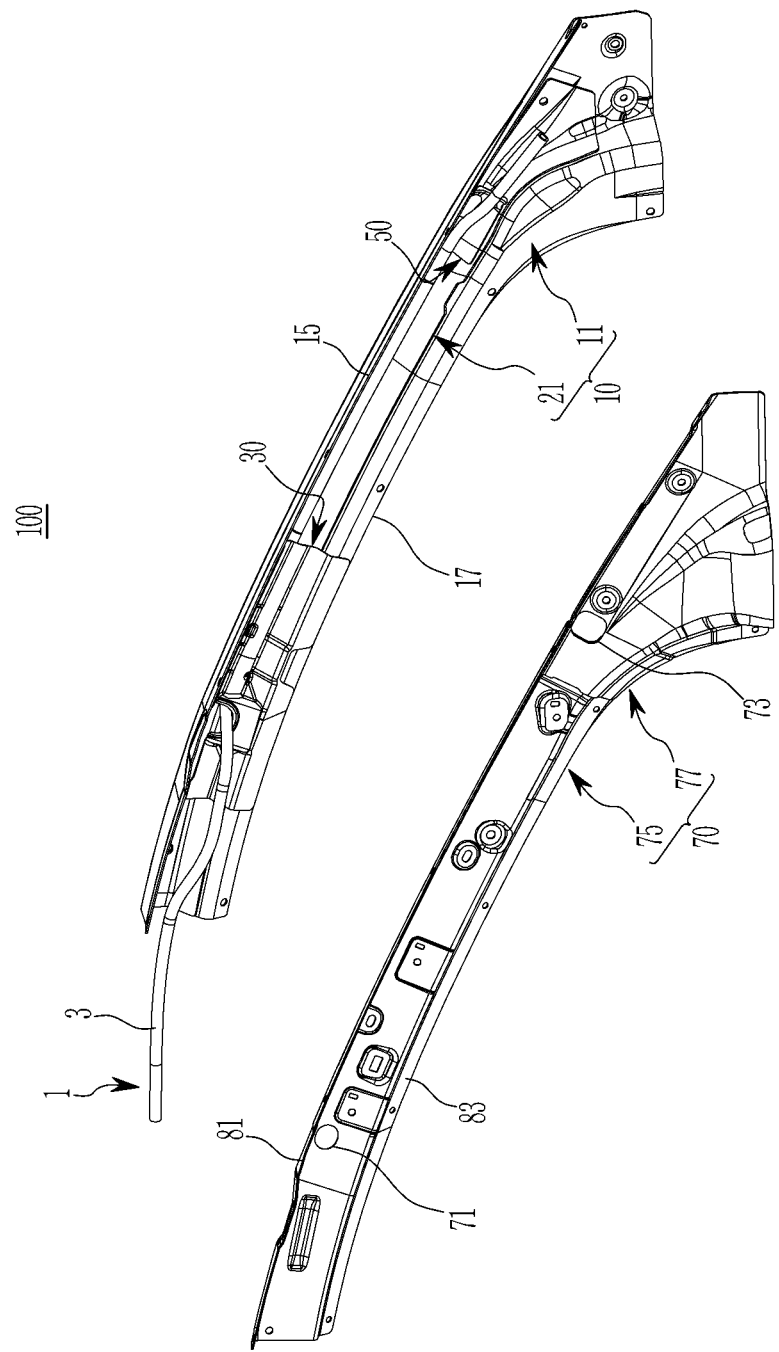
FIG. 3 and FIG. 4 are exploded perspective views showing the front pillar structure according to an embodiment of the present invention.
Figure 4:
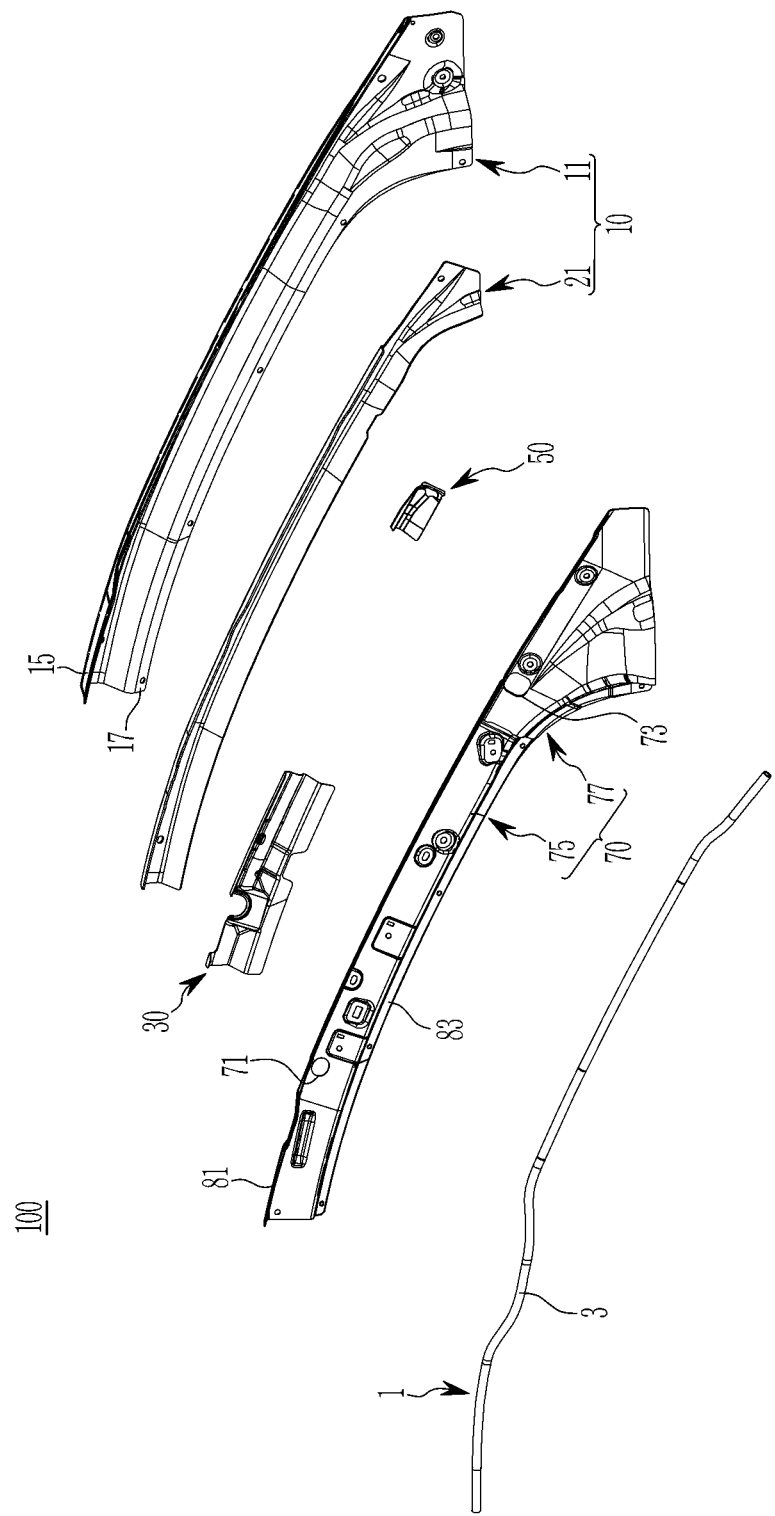

FIG. 3 and FIG. 4 are exploded perspective views showing the front pillar structure according to an embodiment of the present invention.

Referring to FIG. 1, FIG. 3, and FIG. 4, the front pillar structure 100 according to an embodiment of the present invention includes a side outer reinforcement assembly 10, a first reinforcement member 30, a second reinforcement member 50, and a side inner panel assembly 70.

In an embodiment of the present invention, the side outer reinforcement assembly 10 is a side outer assembly of the front pillar structure 100 disposed along the vehicle body front-rear direction. The side outer reinforcement assembly 10 includes a front pillar outer reinforcement member 11 and a side outer reinforcement member 21.

A side outer panel (not shown) is coupled (e.g., welded) to an outer surface of the front pillar outer reinforcement member 11. The front pillar outer reinforcement member 11 may be coupled to the first reinforcement member 30 and the side inner panel assembly 70 described below. This front pillar outer reinforcement member 11 includes a first bonding portion 15 formed at an upper portion thereof along the vehicle body front-rear direction and a second bonding portion 17 formed at a lower portion thereof along the vehicle body front-rear direction.

The side outer reinforcement member 21 is coupled to an inner surface of the front pillar outer reinforcement member 11. The side outer reinforcement member 21 may be coupled to the second reinforcement member 50 that will be described below.

Here, the side outer reinforcement member 21 may be provided in a shape bent toward the inner surface of the front pillar outer reinforcement member 11. The side outer reinforcement member 21 may be bonded (e.g., welded) to an inner surface between the first bonding portion 15 and the second bonding portion 17 of the front pillar outer reinforcement member 11.

Figure 5:
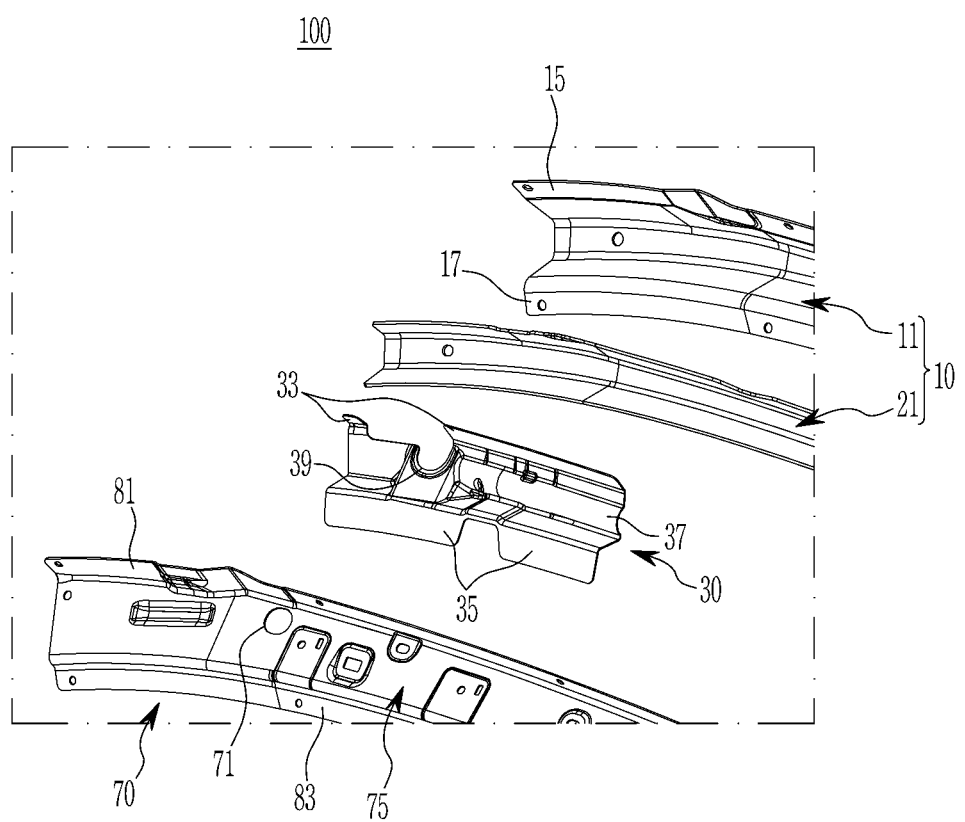
FIG. 5 through FIG. 7 are perspective views showing a first reinforcement member portion applied to the front pillar structure according to an embodiment of the present invention.
Figure 6:
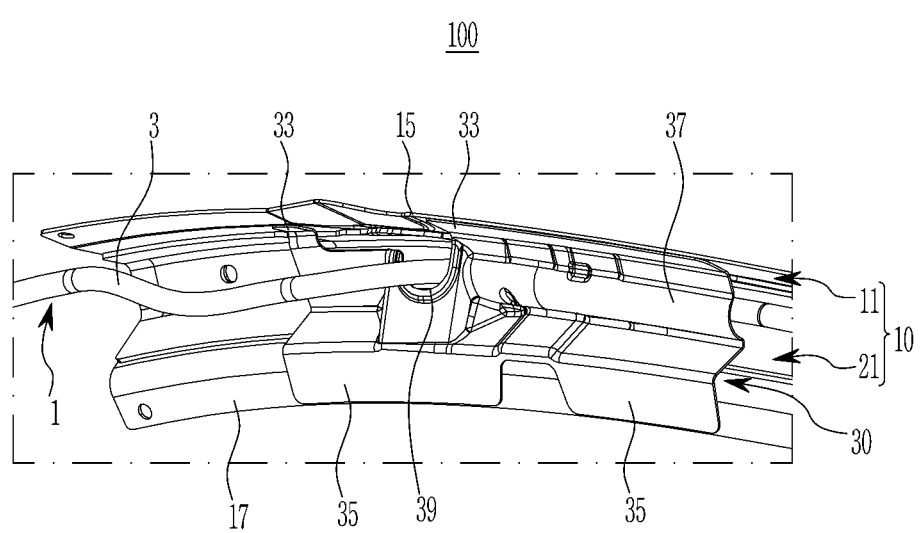
Figure 7:
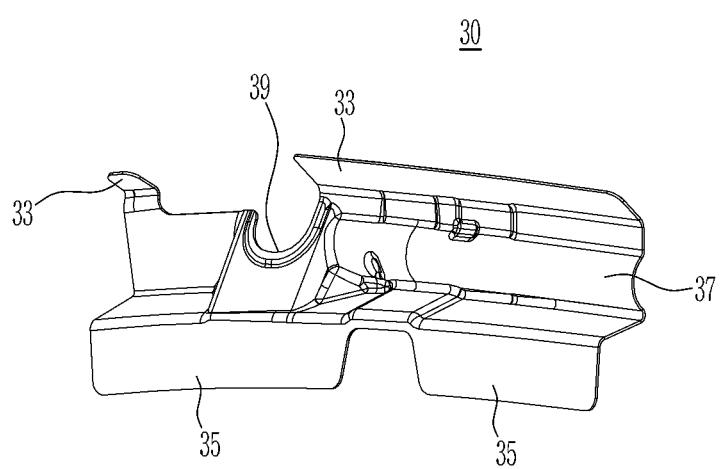
Figure 8:
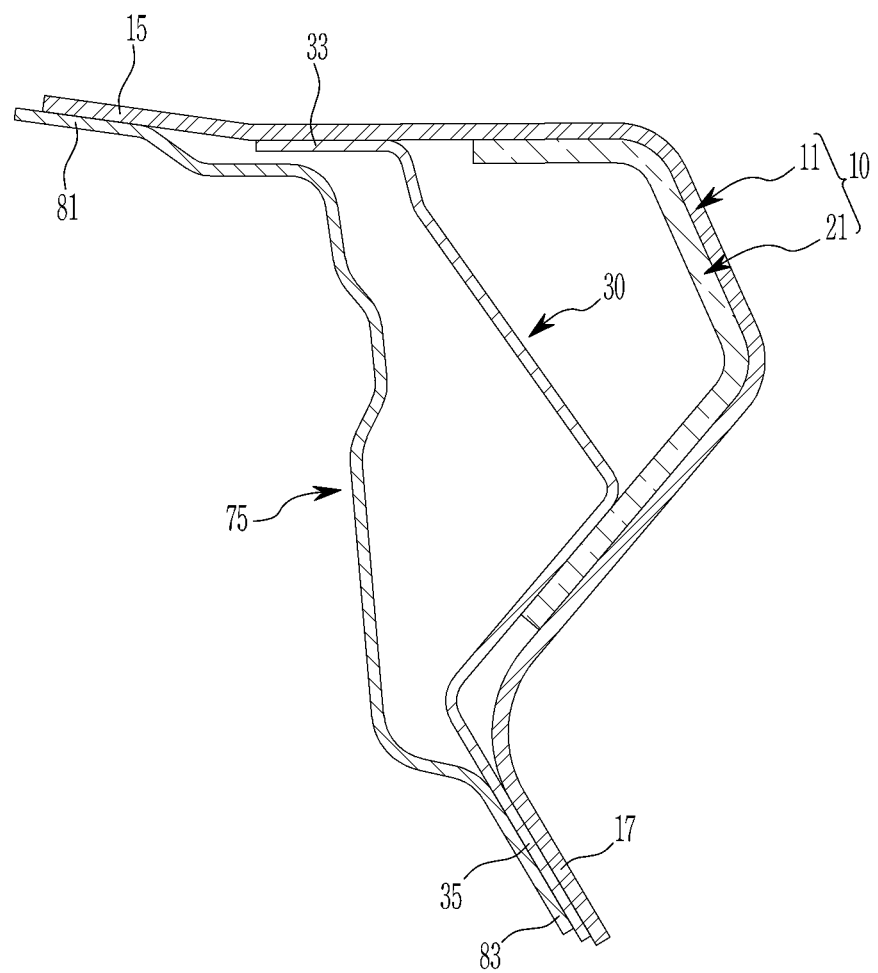
FIG. 8 through FIG. 10 are cross-sectional views showing the first reinforcement member portion applied to the front pillar structure according to an embodiment of the present invention.
Figure 9:
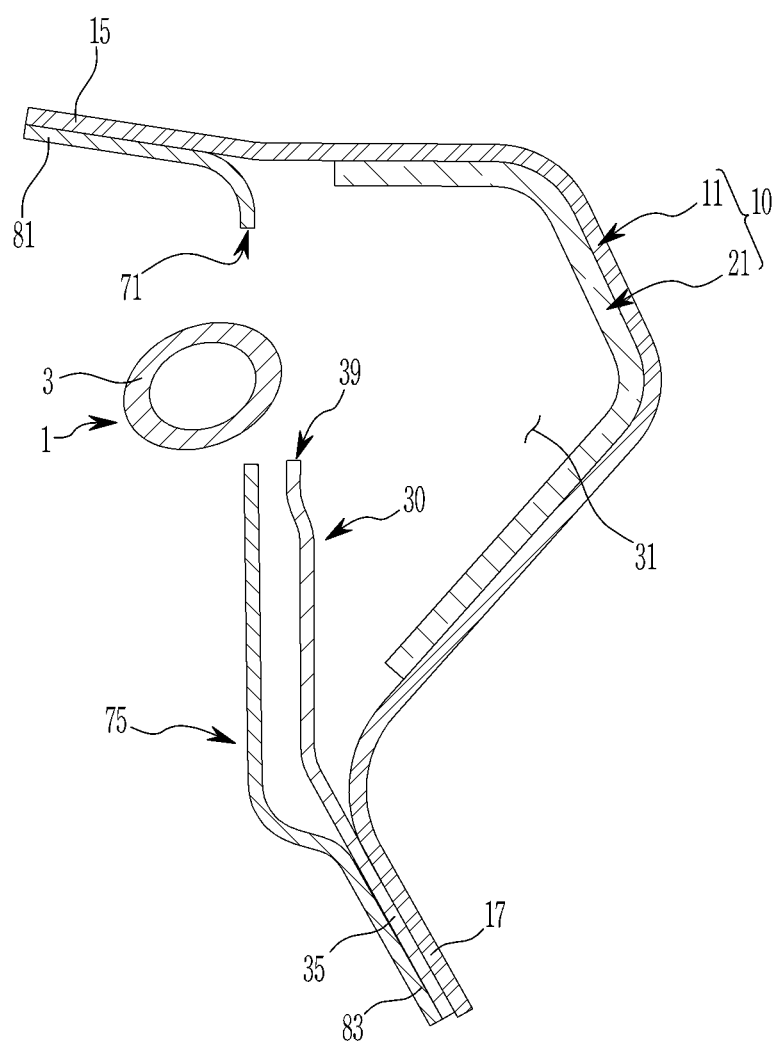
Figure 10:
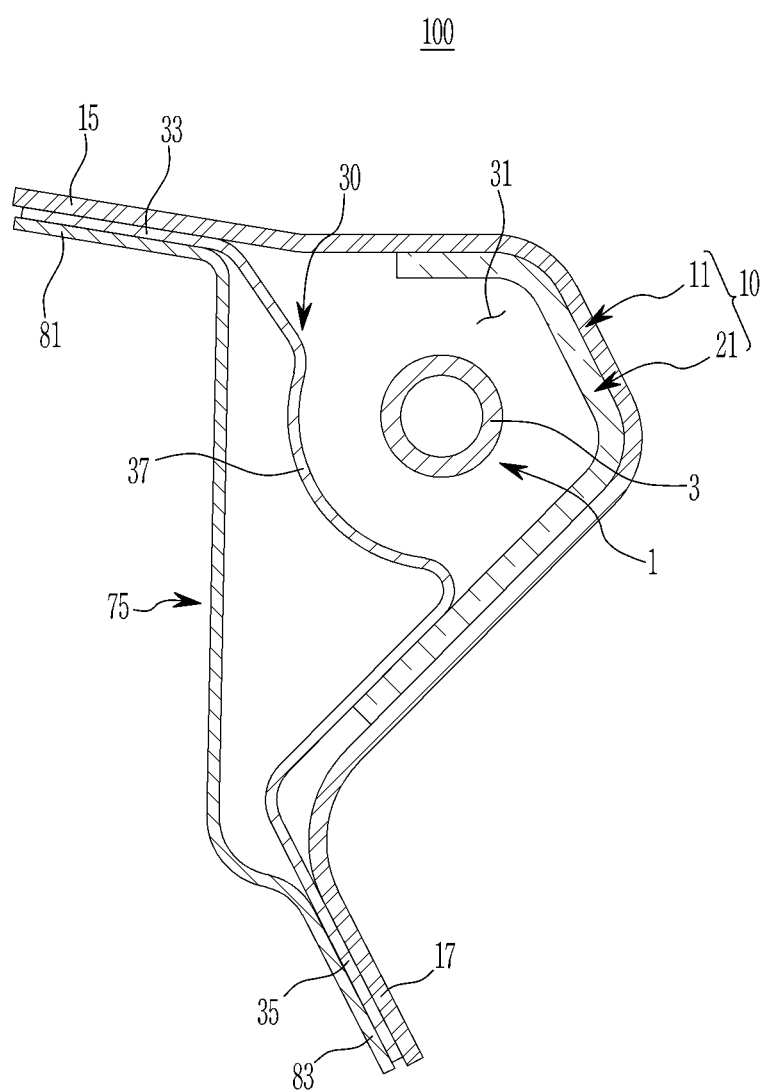
Figure 11:
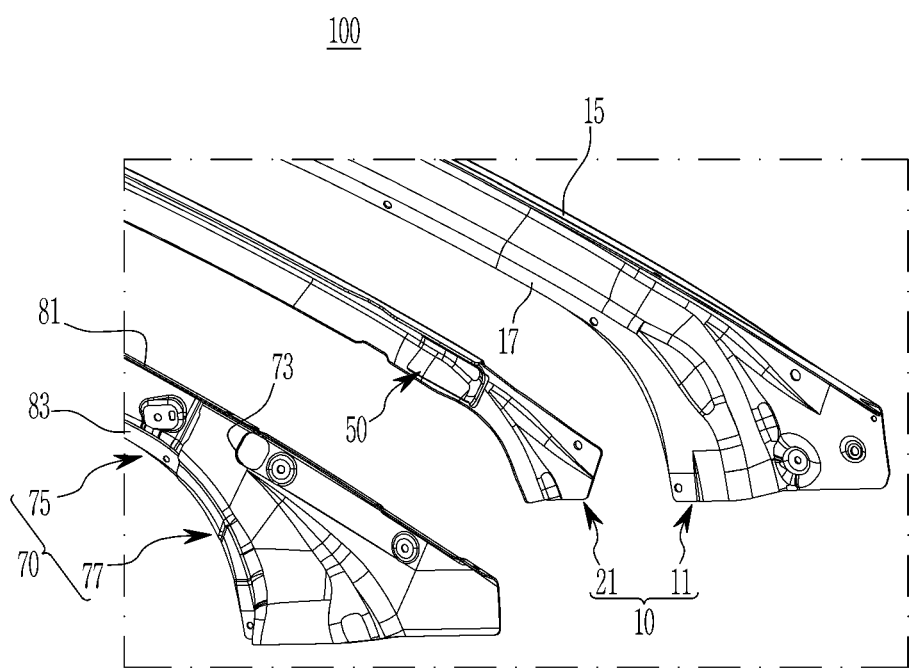
FIG. 11, FIGS. 12A and 12B, and FIGS. 13A and 13B are perspective views showing a second reinforcement member portion applied to the front pillar structure according to an embodiment of the present invention.
Figure 12A:
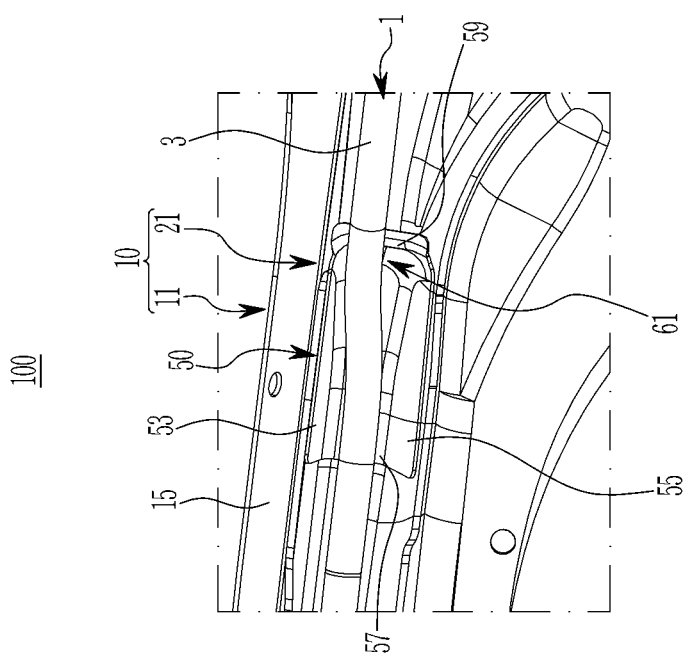
Figure 12B:
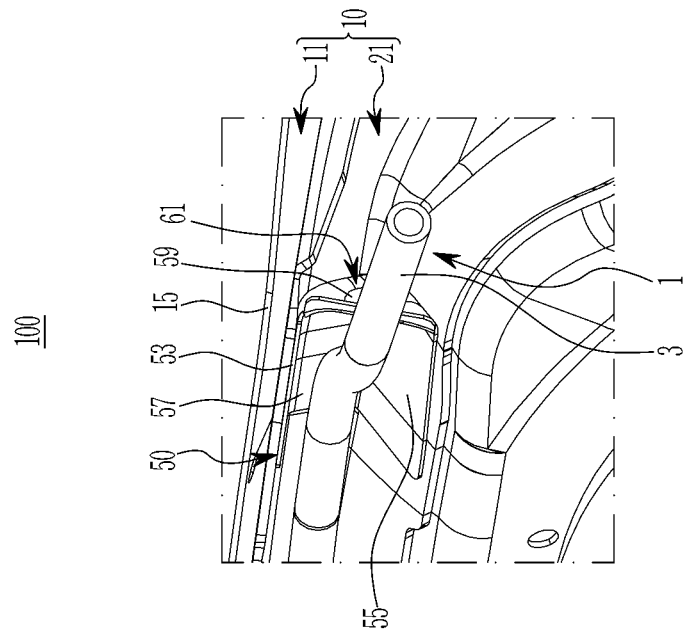
Figure 13A:
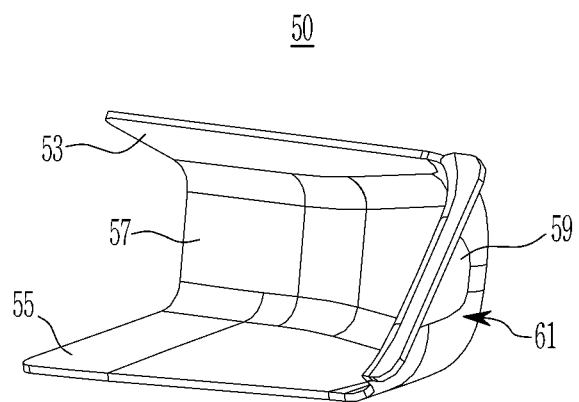
Figure 13B:
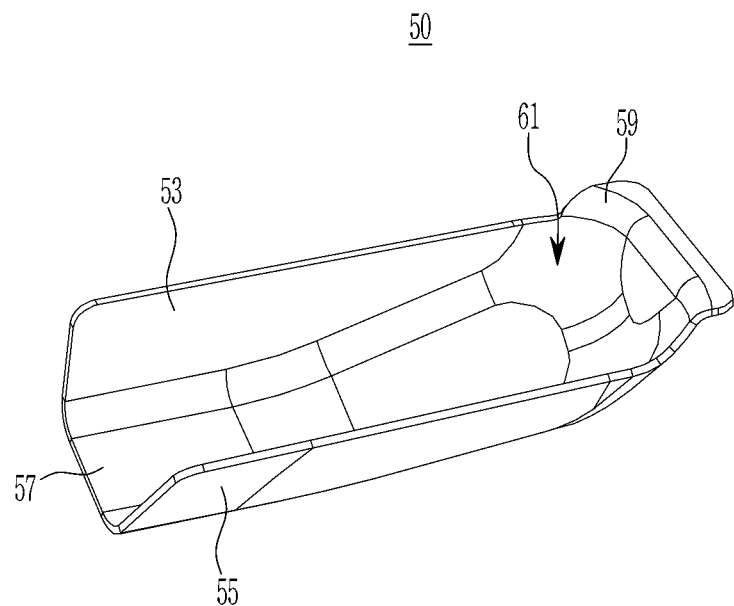

FIG. 5 through FIG. 7 are perspective views showing the first reinforcement member applied to the front pillar structure according to an embodiment of the present invention. FIG. 8 through FIG. 10 are cross-sectional views showing the first reinforcement member applied to the front pillar structure according to an embodiment of the present invention.

Referring to FIG. 5 through FIG. 10, in an embodiment of the present invention, the first reinforcement member 30 is configured to form a first guide passage 31 in which the sensor cleaning hose 3 is introduced at the side outer reinforcement member 21.

The first reinforcement member 30 is coupled to a front portion of the side outer reinforcement assembly 10. The first reinforcement member 30 may be coupled to the front pillar outer reinforcement member 11 with the side outer reinforcement member 21 interposed therebetween. Accordingly, the first guide passage 31 may be formed between the first reinforcement member 30 and the side outer reinforcement member 21.

The first reinforcement member 30 includes a first upper bonding portion 33, a first lower bonding portion 35, a first part guide portion 37, and an introduction guide portion 39.

The first upper bonding portion 33 is formed at an upper portion of the first reinforcement member 30. The first upper bonding portion 33 is bonded (e.g., welded) to the first bonding portion 15 of the front pillar outer reinforcement member 11.

The first lower bonding portion 35 is formed at a lower portion of the first reinforcement member 30. The first lower bonding portion 35 is bonded (e.g., welded) to the second bonding portion 17 of the front pillar outer reinforcement member 11.

The first part guide portion 37 is configured to form the first guide passage 31 at the side outer reinforcement member 21. The first part guide portion 37 is formed (e.g., disposed) between the first upper bonding portion 33 and the first lower bonding portion 35. The first part guide portion 37 is integrally connected to the first upper bonding portion 33 and the first lower bonding portion 35.

Here, the first guide passage 31 is formed between the first part guide portion 37 and the side outer reinforcement member 21. In one example, the first part guide portion 37 may be formed in a shape that is rounded toward an opposite side of an inner surface of the side outer reinforcement member 21.

The introduction guide portion 39 is configured to introduce the sensor cleaning hose 3 into the first guide passage 31. The introduction guide portion 39 is formed at a front portion of the first reinforcement member 30. The introduction guide portion 39 is connected to the first upper bonding portion 33, the first lower bonding portion 35, and the first part guide portion 37.

In one example, the introduction guide portion 39 may be formed as a groove of an approximate 'U' shape connected to the first guide passage 31.

Figure 14:
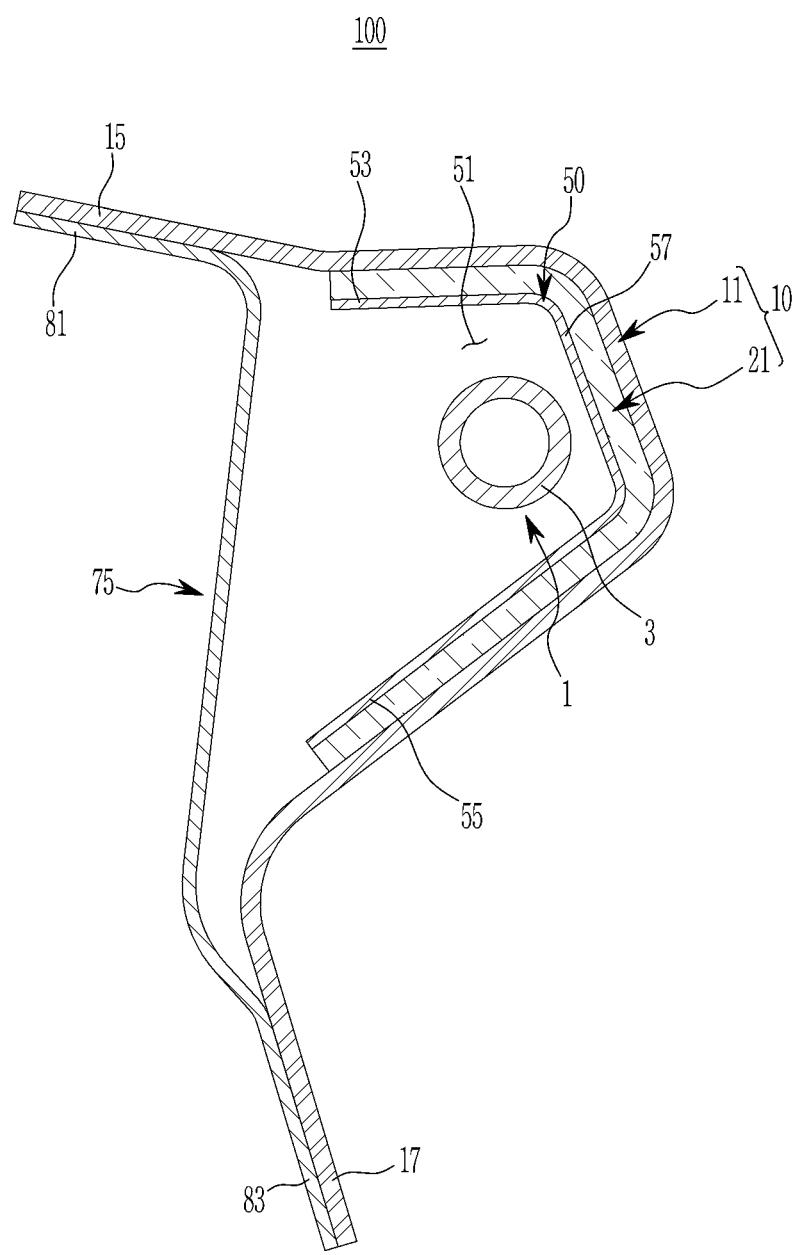
FIG. 14 and FIG. 15 are cross-sectional views showing the second reinforcement member portion applied to the front pillar structure according to an embodiment of the present invention.
Figure 15:
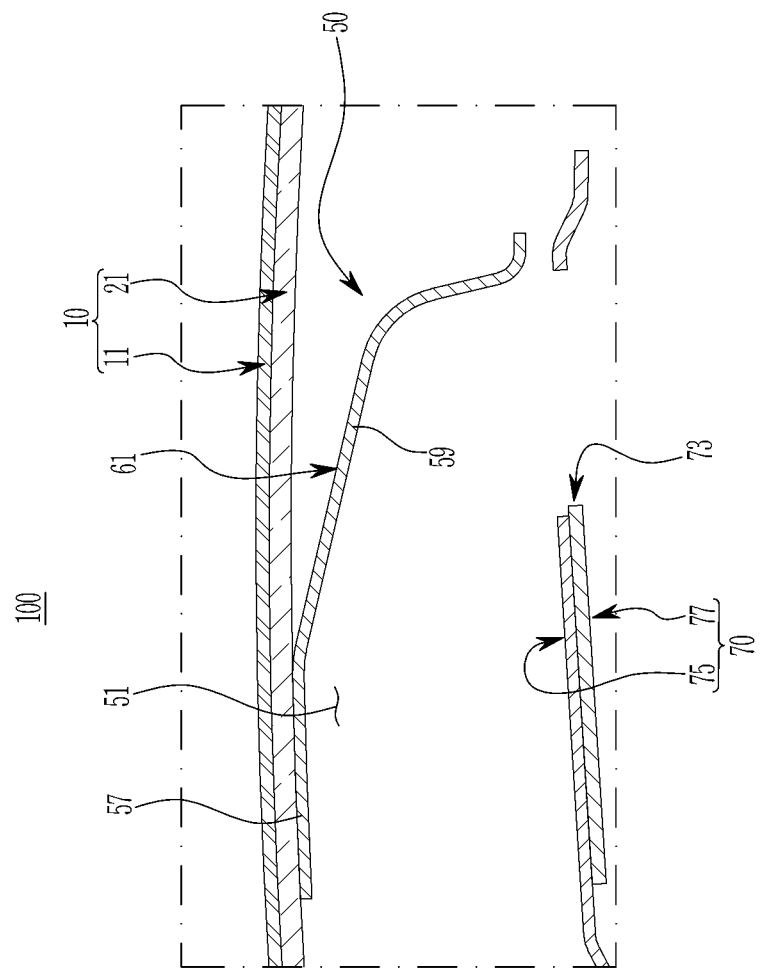

FIG. 11, FIGS. 12A and 12B, and FIGS. 13A and 13B are perspective views showing the second reinforcement member applied to the front pillar structure according to an embodiment of the present invention. FIG. 14 and FIG. 15 are cross-sectional views showing the second reinforcement member applied to the front pillar structure according to an embodiment of the present invention.

Referring to FIG. 11 through FIG. 15, in an embodiment of the present invention, the second reinforcement member 50 is configured to form a second guide passage 51 through which the sensor cleaning hose 3 is drawn at the side outer reinforcement member 21.

The second reinforcement member 50 is coupled to a rear portion of the side outer reinforcement assembly 10. The second reinforcement member 50 may be coupled to the inner surface of the side outer reinforcement member 21.

Here, the second guide passage 51 may be formed between the side inner panel assembly 70 and the second reinforcement member 50 which will be described below.

Furthermore, in one example, the second reinforcement member 50 may be provided in an approximate 'C' cross-section shape bent toward the inner surface of the side outer reinforcement member 21.

The second reinforcement member 50 includes a second upper bonding portion 53, a second lower bonding portion 55, a second part guide portion 57, and a draw guide portion (or a draw-out guide portion) 59.

The second upper bonding portion 53 is formed at an upper portion of the second reinforcement member 50. The second upper bonding portion 53 is bonded (e.g., welded) to an inner surface of an upper portion of the side outer reinforcement member 21.

The second lower bonding portion 55 is formed at a lower portion of the second reinforcement member 50. The second lower bonding portion 55 is bonded (e.g., welded) to an inner surface of a lower portion of the side outer reinforcement member 21.

The second part guide portion 57 is configured to form the second guide passage 51 at the side outer reinforcement member 21. The second part guide portion 57 is formed (e.g., disposed) between the second upper bonding portion 53 and the second lower bonding portion 55. The second part guide portion 57 is integrally connected to the second upper bonding portion 53 and the second lower bonding portion 55.

Here, the second guide passage 51 is formed between the second part guide portion 57 and the side inner panel assembly 70 which will be described below. The second part guide portion 57 extends from the second upper bonding portion 53 and the second lower bonding portion 55 to the inner surface of the side outer reinforcement member 21.

The draw guide portion 59 is configured to draw out the sensor cleaning hose 3 from the second guide passage 51. The draw guide portion 59 is formed at a rear portion of the second reinforcement member 50. The draw guide portion 59 is connected to the second upper bonding portion 53, the second lower bonding portion 55, and the second part guide portion 57.

In one example, the draw guide portion 59 includes an inclined surface 61 inclined toward a draw direction of the sensor cleaning hose 3.

Referring to FIG. 3 through FIG. 15, in an embodiment of the present invention, the side inner panel assembly 70 is a side inner assembly of the front pillar structure 100 disposed along the vehicle body front-rear direction.

The side inner panel assembly 70 is coupled to the side outer reinforcement assembly 10 with the first reinforcement member 30 and the second reinforcement member 50 interposed therebetween. Further, the side inner panel assembly 70 includes an introduction hole 71 connected to the first guide passage 31 and a draw hole 73 connected to the second guide passage 51.

The side inner panel assembly 70 includes a front pillar inner panel 75 and a side inner panel 77.

The front pillar inner panel 75 is coupled to the first reinforcement member 30 and the front pillar outer reinforcement member 11. The front pillar inner panel 75 includes a third bonding portion 81 formed at an upper portion thereof along the vehicle body front-rear direction and a fourth bonding portion 83 formed at a lower portion thereof along the vehicle body front-rear direction.

Here, the third bonding portion 81 is bonded (e.g., welded) to the first upper bonding portion 33 of the first reinforcement member 30 and the first bonding portion 15 of the front pillar outer reinforcement member 11. Further, the fourth bonding portion 83 is bonded (e.g., welded) to the first lower bonding portion 35 of the first reinforcement member 30 and the second bonding portion 17 of the front pillar outer reinforcement member 11.

In addition, the above-mentioned introduction hole 71 is formed at the front pillar inner panel 75. The introduction hole 71 is connected to the introduction guide portion 39 of the first reinforcement member 30. That is, the introduction hole 71 is connected to the first guide passage 31 and the introduction guide portion 39.

The side inner panel 77 is coupled to a front portion of the front pillar inner panel 75 and is coupled to the front pillar outer reinforcement member 11.

The side inner panel 77 is bonded (e.g., welded) to the first bonding portion 15 and the second bonding portion 17 of the front pillar outer reinforcement member 11. Further, the side inner panel 77 may be connected to a crash pad (not shown) in a front portion of the vehicle body. Accordingly, the second guide passage 51 is formed between the side inner panel 77 and the second part guide portion 57 of the second reinforcement member 50.

The above-mentioned draw hole 73 is formed at the side inner panel 77. The draw hole 73 is connected to the draw guide portion 59 of the second reinforcement member 50. That is, the draw hole 73 is connected to the second guide passage 51 and the draw guide portion 59. Here, the inclined surface 61 of the draw guide portion 59 is inclined toward the draw hole 73 (refer to FIG. 15).

Figure 16:
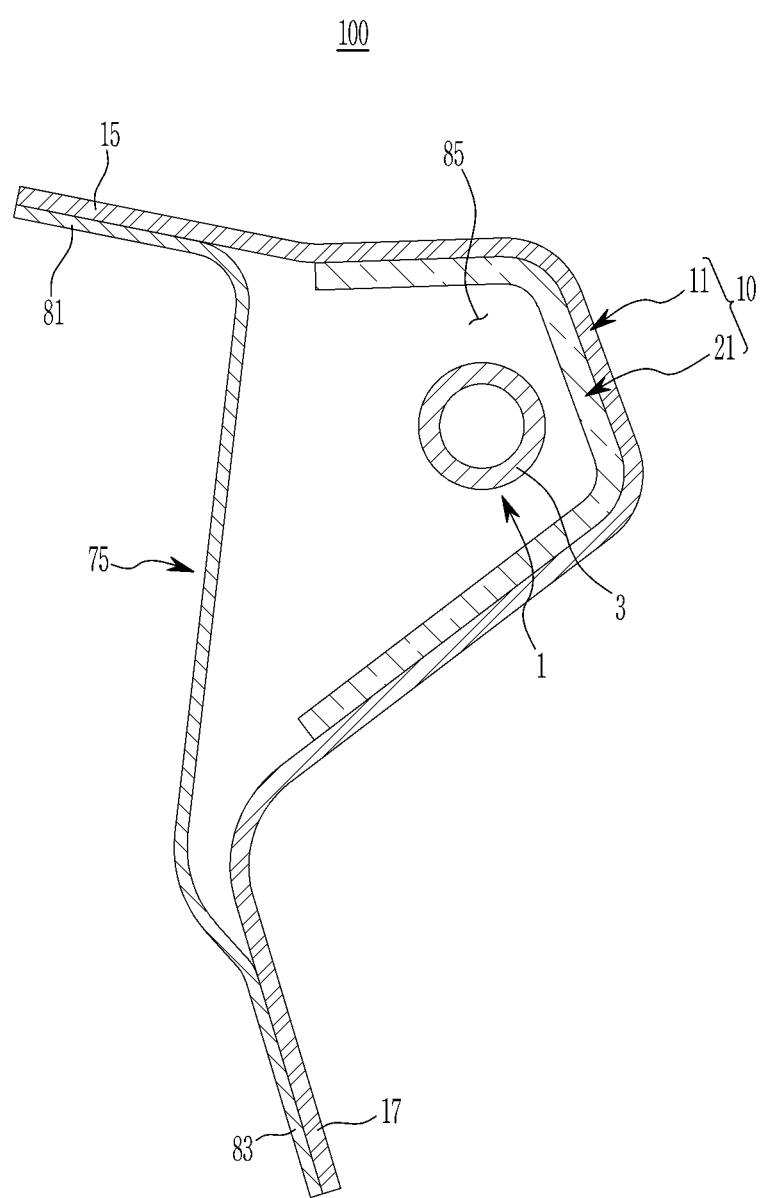
FIG. 16 is a cross-sectional view showing a coupling structure of a front pillar inner panel and a front pillar outer reinforcement member applied to the front pillar structure according to an embodiment of the present invention.

On the other hand, as shown in FIG. 16, a third guide passage 85 is formed between the front pillar inner panel 75 and the side outer reinforcement member 21. The third guide passage 85 between the first guide passage 31 and the second guide passage 51 is connected to the first guide passage 31 and the second guide passage 51.

Figure 17:
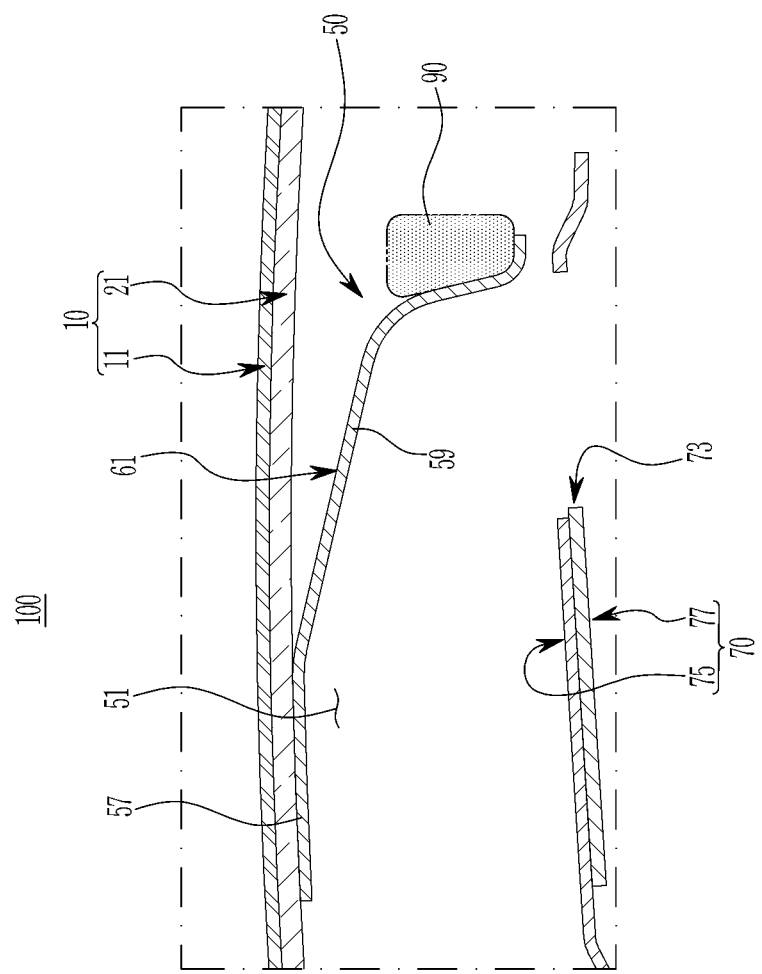
FIG. 17 is a cross-sectional view showing a foam pad layer portion applied to the front pillar structure according to an embodiment of the present invention.

On the other hand, as shown in FIG. 17, the front pillar structure 100 according to an embodiment of the present invention further includes a foam pad layer 90 applied to the second reinforcement member 50.

The foam pad layer 90 is a heating foam pad known to a person of an ordinary skill in the art, and is formed on the draw guide portion 59 of the second reinforcement member 50. The foam pad layer 90 on the draw guide portion 59 may be formed at a surface facing the inner surface of the side outer reinforcement member 21.

The foam pad layer 90 prevents generation of contact noise between the second reinforcement member 50 and the inner surface of the side outer reinforcement member 21. When passing through the painting line, the foam pad layer 90 is foamed by heat and inflated to block the space between the second reinforcement member 50 and the side outer reinforcement member 21. At this time, the foam pad layer 90 blocks various transmitted sounds coming through between the second reinforcement member 50 and the side outer reinforcement member 21, thereby blocking noise entering the vehicle interior.

Hereinafter, an assembly process and an operation of the front pillar structure 100 according to an embodiment of the present invention configured as described above will be described in detail with reference to FIG. 1 through FIG. 17.

First, the side outer reinforcement assembly 10 including the front pillar outer reinforcement member 11, the side outer panel (not shown), and the side outer reinforcement member 21 bonded to each other along the vehicle width direction is provided.

In addition, the first reinforcement member 30 including the first upper bonding portion 33, the first lower bonding portion 35, the first part guide portion 37, and the introduction guide portion 39 is provided.

In addition, the second reinforcement member 50 including the second upper bonding portion 53, the second lower bonding portion 55, the second part guide portion 57, and the draw guide portion 59 is provided.

In addition, the side inner panel assembly 70 including the front pillar inner panel 75 and the side inner panel 77 bonded to each other along the vehicle body front-rear direction is provided.

The first upper bonding portion 33 of the first reinforcement member 30 is bonded to the first bonding portion 15 of the front pillar outer reinforcement member 11. Further, the first lower bonding portion 35 of the first reinforcement member 30 is bonded to the second bonding portion 17 of the front pillar outer reinforcement member 11.

Here, the first guide passage 31 is formed between the first part guide portion 37 of the first reinforcement member 30 and the side outer reinforcement member 21. Further, the introduction guide portion 39 of the first reinforcement member 30 is connected to the first guide passage 31.

Next, the second upper bonding portion 53 of the second reinforcement member 50 is bonded to the inner surface of the upper portion of the side outer reinforcement member 21. Further, the second lower bonding portion 55 of the second reinforcement member 50 is bonded to the inner surface of the lower portion of the side outer reinforcement member 21.

Thereafter, the front pillar inner panel 75 and the side inner panel 77 are bonded to the first bonding portion 15 and the second bonding portion 17 of the front pillar outer reinforcement member 11 with the first reinforcement member 30 and the second reinforcement member 50 interposed therebetween.

Here, the front pillar inner panel 75 is bonded to the first upper bonding portion 33 of the first reinforcement member 30 and the first bonding portion 15 of the front pillar outer reinforcement member 11 through the third bonding portion 81. Further, the front pillar inner panel 75 is bonded to the first lower bonding portion 35 of the first reinforcement member 30 and the second bonding portion 17 of the front pillar outer reinforcement member 11 through the fourth bonding portion 83.

Accordingly, the introduction hole 71 of the front pillar inner panel 75 is connected to the first guide passage 31 and the introduction guide portion 39 of the first reinforcement member 30. Further, the second guide passage 51 is formed between the side inner panel 77 and the second part guide portion 57 of the second reinforcement member 50.

Furthermore, the draw hole 73 of the side inner panel 77 is connected to the second guide passage 51 and the draw guide portion 59 of the second reinforcement member 50. Further, the third guide passage 85 connected to the first guide passage 31 and the second guide passage 51 is formed between the front pillar inner panel 75 and the side outer reinforcement member 21.

Accordingly, the sensor cleaning hose 3 may be introduced into the first guide passage 31 through the introduction hole 71 of the front pillar inner panel 75 and the introduction guide portion 39 of the first reinforcement member 30. In addition, the sensor cleaning hose 3 may be drawn out through the third guide passage 85, the second guide passage 51, the draw guide portion 59 of the second reinforcement member 50, and the draw hole 73 of the side inner panel 77.

The front pillar structure 100 according to an embodiment of the present invention as described so far may easily mount the sensor cleaning hose 3 inside the cross-section of the pillar using the first reinforcement member 30 and the second reinforcement member 50 without increasing the cross-section of the pillar, and may facilitate after-sales service, repair, and replacement of the sensor cleaning hose 3.

In addition, according to the front pillar structure 100 according to an embodiment of the present invention, the first reinforcement member 30 and the second reinforcement member 50 may further improve rigidity (or strength) of the pillar and small overlap collision performance.

Furthermore, according to the front pillar structure 100 according to an embodiment of the present invention, an NVH performance of the vehicle body may be improved as the foam pad layer 90 is formed at the second reinforcement member 50.

While this invention has been described in connection with what is presently considered to be practical embodiments, it is to be understood that the invention is not limited to the disclosed embodiments, but, on the contrary, is intended to cover various modifications and equivalent arrangements included within the spirit and scope of the appended claims.

What is claimed is:

1. A front pillar structure comprising:
a side outer reinforcement assembly;
a first reinforcement member coupled to a front portion of the side outer reinforcement assembly to define a first guide passage through which a flexible part having a predetermined length and mounted to the front pillar structure is introduced;
a second reinforcement member coupled to a rear portion of the side outer reinforcement assembly to define a second guide passage through which the flexible part is drawn; and
a side inner panel assembly coupled to the side outer reinforcement assembly, the side inner panel assembly comprising an introduction hole connected to the first guide passage and a draw hole connected to the second guide passage.

2. The front pillar structure of claim 1, wherein the side outer reinforcement assembly comprises:
a front pillar outer reinforcement member coupled to the first reinforcement member and the side inner panel assembly; and
a side outer reinforcement member coupled to an inner surface of the front pillar outer reinforcement member and coupled to the second reinforcement member.

3. The front pillar structure of claim 2, wherein:
the first reinforcement member is coupled to the front pillar outer reinforcement member with the side outer reinforcement member interposed therebetween; and
the first guide passage is defined between the first reinforcement member and the side outer reinforcement member.

4. The front pillar structure of claim 2, wherein:
the second reinforcement member is coupled to an inner surface of the side outer reinforcement member; and
the second guide passage is defined between the second reinforcement member and the side inner panel assembly.

5. The front pillar structure of claim 2, wherein the side inner panel assembly comprises:
a front pillar inner panel coupled to the first reinforcement member and the front pillar outer reinforcement member; and
a side inner panel coupled to the front pillar inner panel and the front pillar outer reinforcement member.

6. The front pillar structure of claim 5, further comprising a third guide passage defined between the front pillar inner panel and the side outer reinforcement member, the third guide passage being connected to the first guide passage and the second guide passage.

7. The front pillar structure of claim 5, wherein:
the introduction hole is provided at the front pillar inner panel; and
the draw hole is provided at the side inner panel.

8. The front pillar structure of claim 2, wherein the first reinforcement member comprises:
a first upper bonding portion bonded to an upper portion of the front pillar outer reinforcement member;
a first lower bonding portion bonded to a lower portion of the front pillar outer reinforcement member; and
a first part guide portion provided between the first upper bonding portion and the first lower bonding portion to define the first guide passage.

9. The front pillar structure of claim 8, wherein the first reinforcement member further comprises an introduction guide portion connected to the first guide passage and the introduction hole.

10. The front pillar structure of claim 2, wherein the second reinforcement member comprises:
a second upper bonding portion bonded to an upper portion of the side outer reinforcement member;
a second lower bonding portion bonded to a lower portion of the side outer reinforcement member; and
a second part guide portion provided between the second upper bonding portion and the second lower bonding portion to define the second guide passage.

11. The front pillar structure of claim 10, wherein the second reinforcement member further comprises a draw guide portion connected to the second guide passage and the draw hole.

12. The front pillar structure of claim 11, wherein the draw guide portion comprises an inclined surface inclined toward the draw hole.

13. The front pillar structure of claim 1, further comprising a foam pad layer applied to the second reinforcement member.

14. The front pillar structure of claim 1, wherein the flexible part comprises a sensor cleaning hose configured to flow a washer liquid to clean a sensor installed at a roof of a vehicle with the washer liquid.

15. A vehicle comprising:
a vehicle body;
a roof coupled to the vehicle body;
a sensor provided at the roof; and
a flexible part having a predetermined length and coupled to a front pillar structure of the vehicle body, the front pillar structure comprising:
a side outer reinforcement assembly;
a first reinforcement member coupled to a front portion of the side outer reinforcement assembly to define a first guide passage through which the flexible part is introduced;
a second reinforcement member coupled to a rear portion of the side outer reinforcement assembly to define a second guide passage through which the flexible part is drawn; and
a side inner panel assembly coupled to the side outer reinforcement assembly, the side inner panel assembly comprising an introduction hole connected to the first guide passage and a draw hole connected to the second guide passage.

16. The vehicle of claim 15, wherein the side outer reinforcement assembly comprises:
a front pillar outer reinforcement member coupled to the first reinforcement member and the side inner panel assembly; and
a side outer reinforcement member coupled to an inner surface of the front pillar outer reinforcement member and coupled to the second reinforcement member.

17. The vehicle of claim 16, wherein:
the first reinforcement member is coupled to the front pillar outer reinforcement member with the side outer reinforcement member interposed therebetween;
the first guide passage is defined between the first reinforcement member and the side outer reinforcement member;

the second reinforcement member is coupled to an inner surface of the side outer reinforcement member; and the second guide passage is defined between the second reinforcement member and the side inner panel assembly.

18. The vehicle of claim 16, wherein the side inner panel assembly comprises:
   a front pillar inner panel coupled to the first reinforcement member and the front pillar outer reinforcement member; and
   a side inner panel coupled to the front pillar inner panel and the front pillar outer reinforcement member.

19. The vehicle of claim 16, wherein the first reinforcement member comprises:
   a first upper bonding portion bonded to an upper portion of the front pillar outer reinforcement member;
   a first lower bonding portion bonded to a lower portion of the front pillar outer reinforcement member;
   a first part guide portion provided between the first upper bonding portion and the first lower bonding portion to define the first guide passage; and
   an introduction guide portion connected to the first guide passage and the introduction hole.

20. The vehicle of claim 16, wherein the second reinforcement member comprises:
   a second upper bonding portion bonded to an upper portion of the side outer reinforcement member;
   a second lower bonding portion bonded to a lower portion of the side outer reinforcement member;
   a second part guide portion provided between the second upper bonding portion and the second lower bonding portion to define the second guide passage; and
   a draw guide portion connected to the second guide passage and the draw hole, wherein the draw guide portion comprises an inclined surface inclined toward the draw hole.

* * * * *